(12) United States Patent
Wang et al.

(10) Patent No.: US 7,681,787 B2
(45) Date of Patent: Mar. 23, 2010

(54) INTEGRATED CIRCUIT, SYSTEM AND METHOD FOR OBTAINING TECHNICAL INFORMATION OF THE INTEGRATED CIRCUIT

(75) Inventors: Han-Che Wang, Guangdong (CN);
Kuan-Hong Hsieh, Guangdong (CN);
Shin-Hong Chung, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 924 days.

(21) Appl. No.: 11/309,134

(22) Filed: Jun. 27, 2006

(65) Prior Publication Data
US 2007/0080206 A1    Apr. 12, 2007

(30) Foreign Application Priority Data
Oct. 6, 2005    (CN) .................. 2005 1 0100220

(51) Int. Cl.
*G06K 5/00*    (2006.01)
(52) U.S. Cl. ..................... 235/380; 235/382
(58) Field of Classification Search ............... 235/380, 235/382, 382.5, 375
See application file for complete search history.

(56) References Cited

U.S. PATENT DOCUMENTS 6,812,718 B1 *   11/2004   Chong et al. ............... 324/754

FOREIGN PATENT DOCUMENTS

CN          1155149 A        7/1997

* cited by examiner

*Primary Examiner*—Karl D. Frech
(74) *Attorney, Agent, or Firm*—Winston Hsu

(57) ABSTRACT

A method for obtaining technical information of IC is disclosed. The method provides an IC, a computer, and a network terminal. The network terminal stores technical information of the IC. The IC includes a memory. The memory stores link information for obtaining the technical information. Connects the IC to the computer. The computer reads the link information from the memory of IC, and obtains the technical information from the network terminal according to the link information. Using this method, engineers can find the technical information of the IC conveniently and correctly.

6 Claims, 2 Drawing Sheets

INTEGRATED CIRCUIT, SYSTEM AND METHOD FOR OBTAINING TECHNICAL INFORMATION OF THE INTEGRATED CIRCUIT

FIELD OF THE INVENTION

The present invention relates to an integrated circuit (IC) which provides means to obtain technical information thereof. Furthermore, the present invention relates to a system and a method for obtaining technical information of the IC, and particularly relates to system and method for obtaining technical information of the IC through a network.

DESCRIPTION OF RELATED ART

When using integrated circuits (ICs), engineers need to know parameters and capabilities of the IC. Although suppliers provide this corresponding technical information in a manual, however, the manual is usually in a separate entity from the IC. Engineers may have to spend a significant of time to find the manual. Sometimes, the manual may be lost. Supplier also provides this technical information on network. Engineers may log into a related website to find corresponding technical information. However, the website usually stores other information, so the engineer needs to spend time to browse through the website before locating the corresponding technical information, and he (or she) may not locate the corresponding technical information or may find a wrong, irrelevant technical information.

Therefore, what is needed is a system and a method for obtaining technical information of IC conveniently and correctly.

SUMMARY OF INVENTION

A system for obtaining technical information of an IC is provided herein. The system comprises an IC, a test board, a computer, and a network terminal. The IC includes a memory which stores link information for obtaining the technical information. The network terminal stores the technical information. The IC is connected with the test board which is connected with the computer. The computer reads the link information from the memory of the IC, and logs into the network terminal to get the technical information therefrom according to the link information.

A method for obtaining technical information of an IC is provided herein. The method provides an IC, a computer, and a network terminal. The network terminal stores technical information of the IC. The IC includes a memory. The memory stores link information for obtaining the technical information. Connects the IC to the computer. The computer reads the link information from the memory of the IC, and obtains the technical information from the network terminal according to the link information.

Further features and advantages will be provided or will become apparent in the course of the following detailed description.

DETAILED DESCRIPTION

Figure 1:
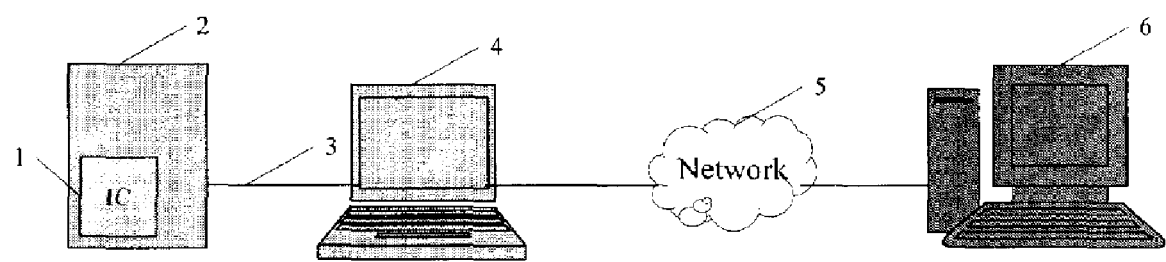
FIG. 1 is a schematic diagram of a hardware infrastructure of a system for obtaining technical information of an IC.

Referring to FIG. 1, a system for obtaining technical information of an IC is shown. The system includes an IC 1, a test board 2, a computer 4, and a network terminal 6. The network terminal 6 stores technical information of the IC 1. The technical information includes specifications, development manuals, etc. The IC 1 includes a memory. The memory has a special storage area. The special storage area stores link information therein. The link information is for obtaining the technical information from the network terminal 6. The link information includes a network address of the network terminal 6, the type of the IC, and the manufacturer of the IC, etc. To avoid any user changing or deleting the link information, the link information is designed in a read-only form. In addition, the link information can be in any suitable format, such as, for example, a text file, an executable file, and so on. The IC 1 is electrically connected to the test board 2.

The test board 2 is connected to the computer 4 by a signal link 3. The signal link 3 can be any suitable communication interface, such as, for example, a USB port, a RS-232 port, and the like. The computer 4 reads the link information from the memory of the IC 1, logs into the network terminal 6 via a network 5 according to the network address, and gets the technical information based on the type of the IC 1 and the manufacturer of the IC 1.

Figure 2:
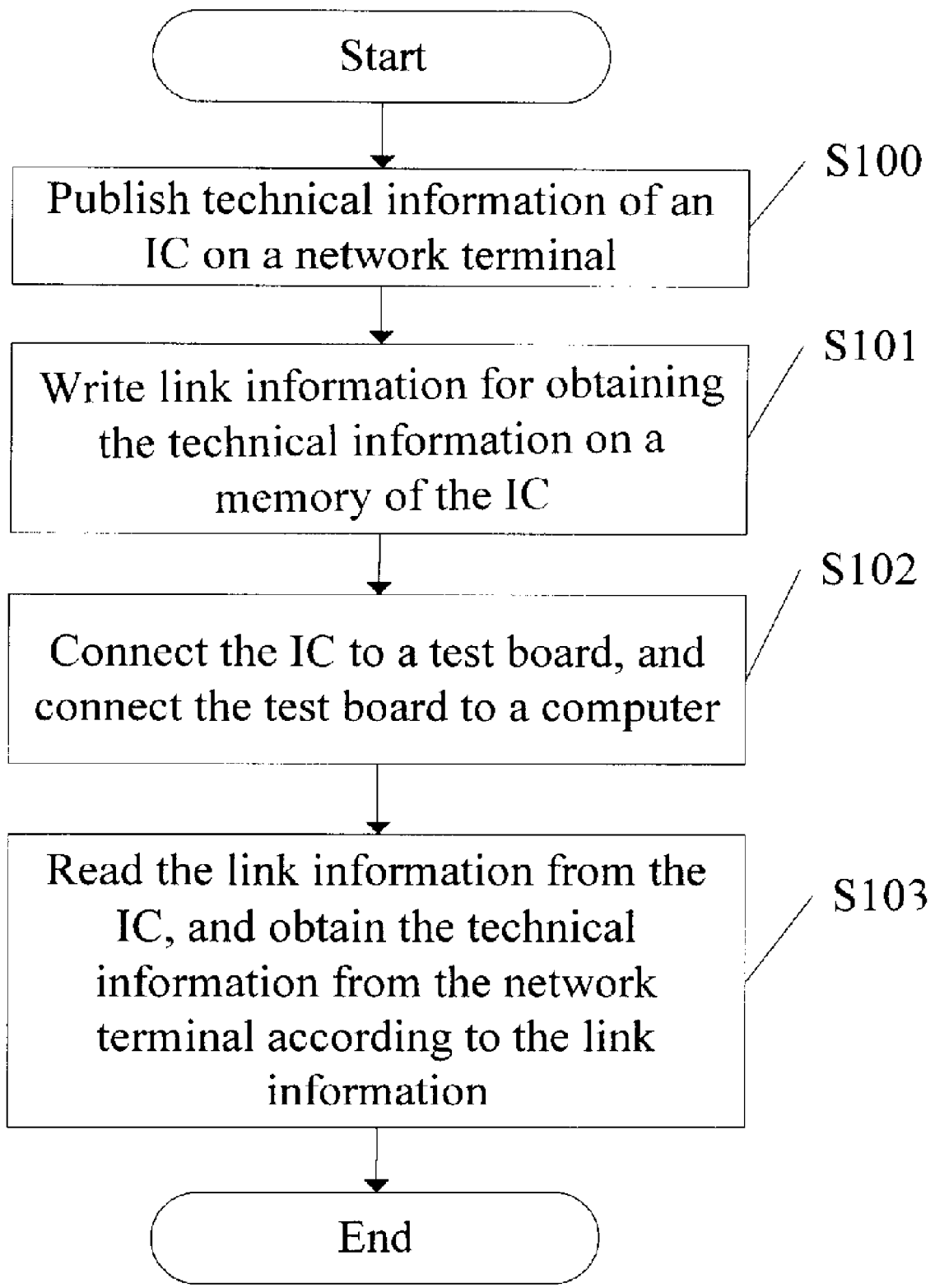
FIG. 2 is a flow diagram of a preferred method for obtaining technical information of an IC, by utilizing the system of FIG. 1.

Referring to FIG. 2, a preferred method for obtaining the technical information of the IC 1 is disclosed. In step S100, designers of the IC 1 publish the technical information of the IC1 on the network terminal 6 in advance. The technical information includes specifications, development manuals, etc. The technical information can be stored in PDF, or HTML, or any other formats. In step S101, the designers write the link information for obtaining the technical information on the memory of the IC 1. In step S102, a user of the IC 1 connects the IC 1 to the test board 2 and connects the test board 2 to the computer 4 by the signal link 3 whenever he/she desires to know the technical information of the IC1. In step S103, the computer 4 reads the link information from the IC 1, logs into the network terminal 6 via the network 5 according to the network address, and gets the technical information from the network terminal 6 based on the type along with the manufacturer of the IC1.

Moreover, it is to be understood that the invention may be embodied in other forms without departing from the spirit thereof. Thus, the present examples and embodiments are to be considered in all respects as illustrative and not restrictive, and the invention is not to be limited to the details given herein.

What is claimed is:

1. An integrated circuit used in a test board, the integrated circuit comprising:
   a memory storing link information;
   wherein the link information is for logging into a network terminal thereby getting technical information of the integrated circuit from the network terminal; and
   the link information comprises a network address, a type of the integrated circuit, and a manufacturer of the integrated circuit.

2. The integrated circuit of claim 1, wherein the link information is read-only.

3. A system for obtaining technical information of an integrated circuit, the system comprising:
   an integrated circuit comprising a memory, the memory storing link information for obtaining the technical information of the integrated circuit;

a test board;

a computer; and a network terminal storing the technical information of the integrated circuit;

wherein the integrated circuit is connected with the test board, the test board is connected with the computer, the computer reads the link information from the memory of the integrated circuit, and logs into the network terminal to get the technical information therefrom according to the link information; and the link information comprises a network address, a type of the integrated circuit, and a manufacturer of the integrated circuit.

4. The system of claim 3, wherein the link information is read-only.

5. A method for obtaining technical information of an integrated circuit, the method comprising the steps of:

providing an integrated circuit comprising a memory, wherein the memory stores link information for obtaining the technical information of the integrated circuit;

providing a network terminal which stores the technical information of the integrated circuit;

connecting the integrated circuit to a test board and connecting the test board to a computer;

reading the link information from the memory of the integrated circuit, and logging into the network terminal, thereby getting the technical information of the integrated circuit, wherein the link information comprises a network address, a type of the integrated circuit, and a manufacturer of the integrated circuit.

6. The method of claim 5, wherein the link information is read-only.

* * * * *